United States Patent [19]

Inkol

[11] Patent Number: 4,859,985
[45] Date of Patent: Aug. 22, 1989

[54] RECONFIGURABLE PARAMETER FILTER HAVING FILTER SECTIONS SELECTIVELY OPERATING INDEPENDENTLY ON RESPECTIVE LOW PRECISION BINARY NUMBERS OR TOGETHER ON A HIGHER PRECISION BINARY NUMBER

[75] Inventor: Robert J. Inkol, Gloucester, Canada

[73] Assignee: Her Majesty the Queen in right of Canada, as represented by the Minister of National Defence, Ottawa, Canada

[21] Appl. No.: 110,272

[22] Filed: Oct. 20, 1987

[30] Foreign Application Priority Data

Dec. 23, 1986 [CA] Canada .................................. 526132

[51] Int. Cl.[4] .............................................. G06F 7/02
[52] U.S. Cl. ................................................... 340/146.2
[58] Field of Search ...................................... 340/146.2

[56] References Cited

U.S. PATENT DOCUMENTS 4,748,438  5/1988  Mickeal ........................... 340/146.2
4,760,374  7/1988  Moller .............................. 340/146.2

OTHER PUBLICATIONS

Croad, "Range Comparator" *IBM Tech. Disclosure Bulletin*, vol. 7, No. 12, May 1965, pp. 1158-1159.
Hanna, "Associative Comparator" *IBM Tech. Disclosure Bulletin*, vol. 25, No. 4, Sep. 1982, pp. 1871-1873.

*Primary Examiner*—David H. Malzahn
*Attorney, Agent, or Firm*—Stevens, Davis, Miller & Mosher

[57] ABSTRACT

The disclosure teaches a reconfigurable parameter filter of the type useful in radar ESM systems. The filter has first and second sections adapted to be supplied with first and second binary numbers, respectively. Each section consists of upper and lower limit storage registers and upper and lower limit comparators, the comparators being coupled to an AND gate and responsive to the respective binary number to enable the AND gate if the value of the signal lies within the window set by the storage registers. The two sections can operate on two independent data words or can be coupled to act as a unit on one data word under the control of a mode selecting circuit. As a result the same standardized circuit module can process either one high precision parameter number or two low precision parameter numbers.

3 Claims, 2 Drawing Sheets

RECONFIGURABLE PARAMETER FILTER HAVING FILTER SECTIONS SELECTIVELY OPERATING INDEPENDENTLY ON RESPECTIVE LOW PRECISION BINARY NUMBERS OR TOGETHER ON A HIGHER PRECISION BINARY NUMBER

The present application relates to signal processing circuits and, in particular, to parameter filtering circuits useful in analyzing signals received from radar emitters.

It is known in electronic support measures (ESM) to analyze various characteristics of each received signal by representing each characteristic by a binary word or number, hereinafter called a parameter representing one of the characteristics of the signal. Typical characteristics are the time of arrival, angle of arrival, pulse width, amplitude and frequency. The measured parameter data sets are compared on a number to number basis with predetermined sets of parameter ranges or windows and situations where all measured parameters lie within the windows are identified. This process is defined as parameter filtering.

Such analysis of parameters is discussed in Canadian Pat. No. 1,121,036 issued Mar. 30, 1982 to Raytheon Company. Applicant's copending Canadian application Ser. No. 496,096 filed Oct. 29, 1985, corresponding to U.S. Pat. No. 4,748,438 issued May 31, 1988 in the name of J. F. Mickeal discloses a form of parameter filter in which a binary storage register is provided for each parameter. This register is set with a binary word corresponding to the expected value of the parameter and the outputs of each register are connected to a common AND gate. If all parameters match, then the AND gate is enabled and can be used to excise subsequent signals which are identical to signals already received thus avoiding overloading the signal analyzing circuitry. Alternatively, if it is desired to follow a single signal of particular significance then the occurrence of a match identified by enabling of the AND gate can be used to pass only such matching signals for subsequent processing.

As described in the above-identified patent and application the volume of data is such that either complex circuitry is required to handle it or unacceptable slow processing results. This application provides a technique by which a single standardized integrated circuit module can be reconfigured to efficiently handle parameter data of high or low resolution—the same standardized circuit module can process either a high precision parameter number or two low precision parameter numbers. Therefore, for a given integrated circuit technology, the overall component count of a system can be reduced and/or the capability increased.

Since such circuits are likely to be used in integrated circuit form, to keep cost, size and power consumption to acceptable levels, for a system with more than a few filters, it may not be practical to implement the system on a single chip. It is therefore necessary to partition the system among a number of chips which for economic reasons should be identical. The present invention achieves this result by providing a small amount of additional logic to permit an N-bit single number parameter filter to be split into a double number parameter filter of length K and M respectively, where $K+M=N$. Therefore a single standardized device can implement one or two filters depending on the data precision required. Since the outputs of the individual single number parameter filters are gated by an AND gate to provide the filter output, the outputs of the double parameter filter can be similarly gated so that no increase in input/output connections results except for the single Mode Select line.

Specifically, the present invention is used in a reconfigurable parameter filter having first and second sections adapted to be supplied with first and second binary numbers, respectively, each section consisting of upper and lower limit storage registers and upper and lower limit comparators. The comparators are coupled to an AND gate and are responsive to the respective binary signal to enable the AND gate if the value of the signal lies within the window set by the storage registers. The invention relates to the improvement comprising: a mode selecting circuit including an OR gate having as one input the output of the AND gate of the second section and as its other input a mode select signal, and a pair of AND gates each having as one input the output of the upper and lower limit comparators of the second section, respectively, and as the other input the mode selecting signal. The output of each of the two AND gates is connected to the upper and lower limit comparators, respectively, of the first section. The sections operate on independent data words unless the pair of AND gates are enabled to couple the sections to act as a unit.

A particular embodiment of the invention will now be described in conjunction with the accompanying drawings, in which.

DESCRIPTION OF THE PREFERRED EMBODIMENT

Figure 1:
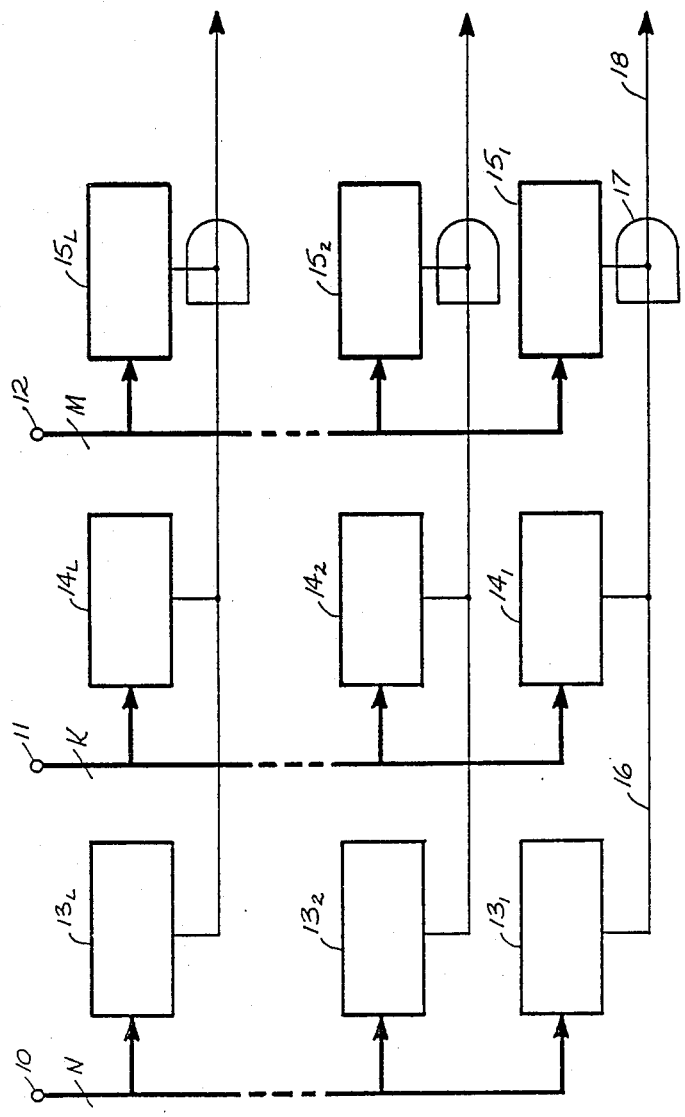
FIG. 1 shows a basic parameter filter array.

FIG. 1 shows the computer architecture of a basic parameter filter array of L filters. Terminals 10, 11 and 12 are adapted to receive binary signals representing parameters of interest. Typically, the parameter supplied to terminal 10 could be an N-bit number, the parameter supplied to terminal 11 a K-bit number and the parameter supplied to terminal 12 an M-bit number. Each row forms a single filter for three parameters. Filter 1 consists of cells $13_1$, $14_1$ and $15_1$, filter 2 similarly consists of cells $13_2$, $14_2$ and $15_2$ and filter L consists of cells $13_L$, $14_L$ and $15_L$. The output of each cell in a filter goes to a common line 16 connected to a summing unit 17 which implies a wired AND logic function. When there is coincidence between the binary numbers representing the parameters and the numbers stored in the respective cells, summing unit 17 is enabled to give an output signal on line 18.

Figure 2:
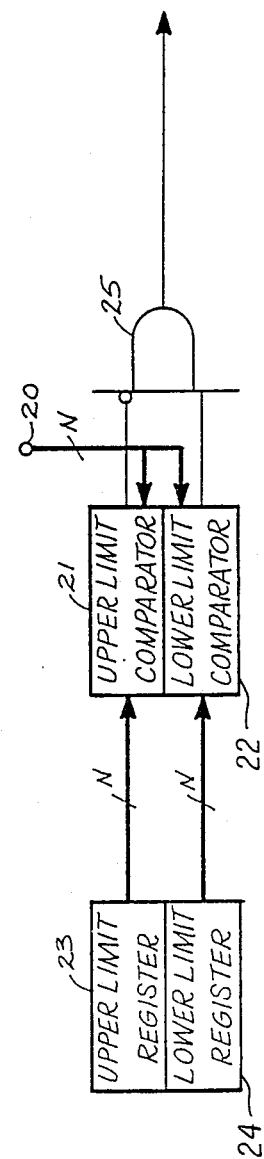
FIG. 2 shows one cell of the filter of FIG. 1 in greater detail.

FIG. 2 shows one filter cell in greater detail. Terminal 20 receives the binary word representing the parameter of interest, for example an N-bit word. This word is supplied to comparators 21 and 22. These comparators are also supplied with binary signals from upper and lower limit registers 23 and 24. The output from comparator 21 is connected to an inverting input of an AND gate 25 and the output from comparator 22 goes to another input of AND gate 25. If the parameter signal exceeds the number stored in the lower limit register and is less than the number stored in the upper limit register then AND gate 25 is enabled to indicate that the parameter signal at terminal 20 falls within the window.

Figure 3:
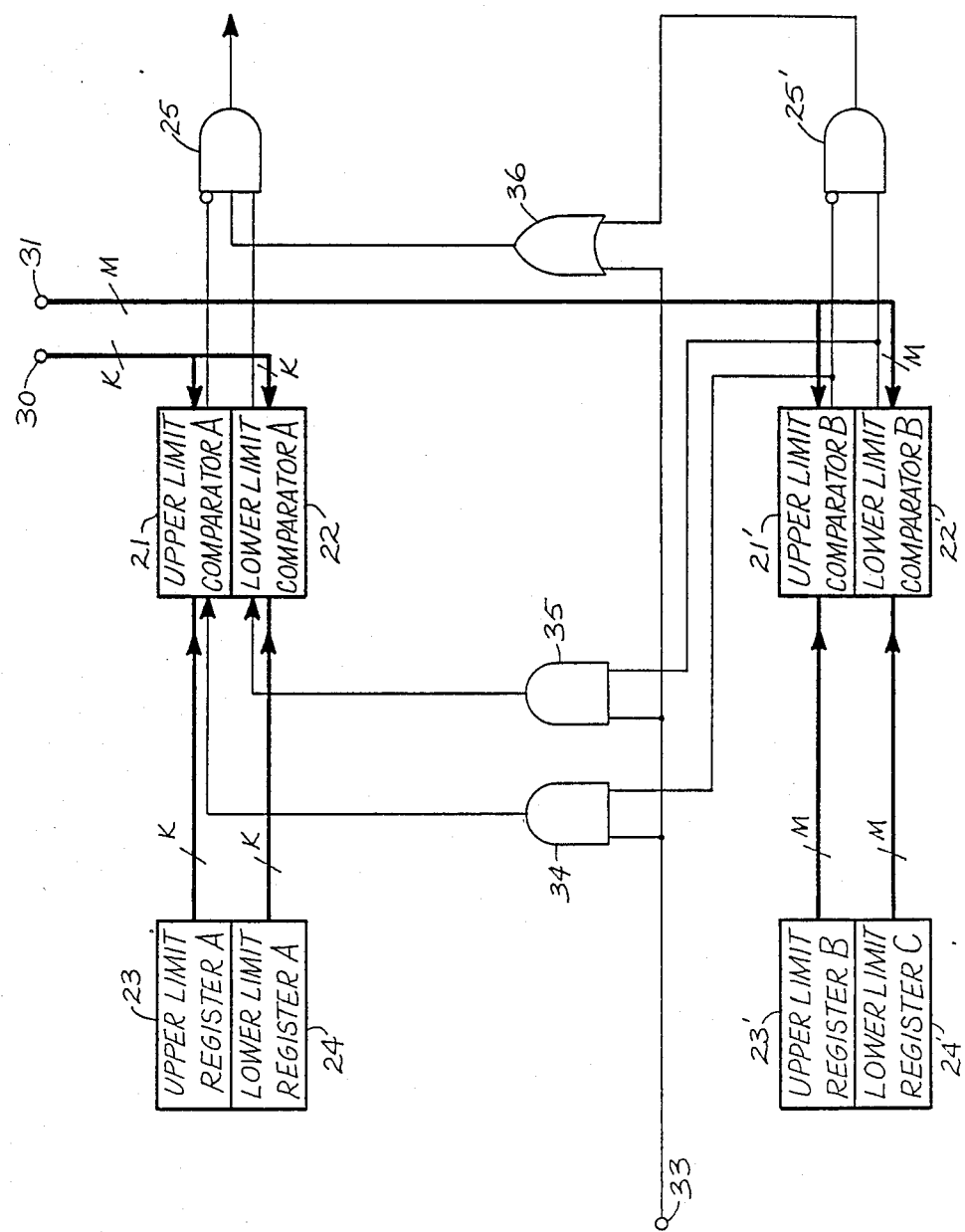
FIG. 3 shows a cell of a reconfigurable filter in accordance with the present invention.

FIG. 3 shows a reconfigurable parameter filter cell constructed in accordance with this invention. It will be seen that this cell has two sections each corresponding to the cell of FIG. 2. Terminals 30 and 31 are adapted to receive binary words representing parameters which may, for example, be a K-bit number at terminal 30 and an M-bit number at terminal 31, these signals being representative of two parameters. Alternatively, a (K+M)-bit single number may be represented by the signals supplied to these terminals, if greater resolution in signal processing is needed. Terminal 30 is connected to upper and lower limit comparators 21 and 22 as previously described and terminal 31 is similarly connected to upper and lower limit comparators 21' and 22'. These comparators function to determine if the signals at terminals 30 and 31 fall within the window limits set by registers 23 and 24 and set by registers 23' and 24'. If the signals do fall within the windows then AND gates 25 and 25' are enabled as previously described.

Additional mode selecting circuitry is provided to control the cell so that the sections act as a single unit. A terminal 33 is provided to receive the mode control signal and is connected to one input of each of AND gates 34 and 35 and to one input of OR gate 36. The other inputs of AND gates 34 and 35 come from the outputs of comparators 21' and 22'. The other input to OR gate 36 comes from the output of AND gate 25'. The outputs of AND gates 34 and 35 go to the expansion inputs of the upper and lower limit comparators 21 and 22, respectively.

The action of the mode select signal is as follows:

| Mode Select | Function |
| --- | --- |
| 0 | Independent K and M-bit window comparators with AND gated output |
| 1 | (K +M) -bit window comparator |

When the mode select signal is 0 then AND gates 34 and 35 are not enabled and the two halves of the cell operate independently. If coincidence is detected by AND gate 25' this coincidence is passed through OR gate 36 to AND gate 35 the output of which gives the complete filter output.

When mode select signal is 1 then AND gates 34 and 35 are enabled and the signal detection limits of comparators 21' and 22' are passed through to comparators 21 and 22 so that coincidence is indicated only when both comparators 21 and 22 and 21' and 22' fall within the appropriate limits. The output of AND gate 25' plays no part since OR gate 36 is enabled by the mode select signal.

Thus the application has described a single parameter filter, preferably implemented as an integrated circuit and reconfigurable under user control to efficiently handle data of either high or low precision. The overheads in circuit complexity or performance to achieve this are minimal.

The embodiments of the invention in which an exclusive property or privilege is claimed are defined as follows:

1. A reconfigurable parameter filter comprising:
   first and second filter sections respectively supplied with first and second binary numbers, each filter section comprising:
   an upper limit storage register for storing an upper limit binary number;
   a lower limit storage register for storing a lower limit binary number;
   an upper limit comparator having one input for receiving an upper limit binary number stored in said upper limit storage register and another input for receiving one of said first and second binary numbers;
   a lower limit comparator having one input for receiving a lower limit binary number stored in said lower limit storage register and another input for receiving the same one of said first and second binary numbers, which is received by the upper limit comparator; and,
   an output AND gate having inputs for respectively receiving comparison outputs of said upper and lower limit comparators, one of said comparison outputs being inverted, said output AND gate providing an output signal if the one of said first and second binary numbers supplied to said upper and lower limit comparators is within a comparison window set by the binary numbers stored by said upper and lower limit storage registers;
   the upper and lower limit comparators of said first filter section receiving said first binary number and the upper and lower limit comparators of said second filter section receiving said second binary number; and,
   means for selectively interconnecting said first and second filter sections in response to a mode control signal by coupling the respective comparison outputs of the upper and lower limit comparators of one filter section to respective expansion inputs of the upper and lower limit comparators of the other filter section so that, when interconnected, said first and second binary numbers are processed by said first and second filter sections as portions of a single high precision binary number and, when not interconnected, said first and second binary numbers are separately processed as independent binary numbers by said first and second filter sections.

2. A reconfigurable parameter filter as in claim 1 wherein said means for selectively interconnecting comprises:
   a pair of AND gates each having one input for receiving said mode control signal and another input for receiving a respective comparator output from one of the upper and lower limit comparators of said one filter section, outputs of said pair of AND gates being respectively coupled to the expansion inputs of said upper and lower limit comparators of said other filter section; and
   an OR gate having one input receiving the output of the output AND gate of said one filter section and another input receiving said mode control signal, the output of said OR gate being applied as another input to the output AND gate of said other filter section.

3. A reconfigurable parameter filter comprising:
   first and second filter sections respectively supplied with first and second binary numbers, each filter section comprising:
   an upper limit storage register for storing an upper limit binary number;
   a lower limit storage register for storing a lower limit binary number;

an upper limit comparator having one input for receiving an upper limit binary number stored in said upper limit storage register and another input for receiving one of said first and second binary numbers;

a lower limit comparator having one input for receiving a lower limit binary number stored in said lower limit storage register and another input for receiving the same one of said first and second binary numbers, which is received by the upper limit comparator; and, means for respectively receiving comparison outputs of said upper and lower limit comparators and providing an output signal if the one of said first and second binary numbers supplied to said upper and lower limit comparators is within a comparison window set by the binary numbers stored by said upper and lower limit storage registers;

the upper and lower limit comparators of said first filter section receiving said first binary number and the upper and lower limit comparators of said second filter section receiving said second binary number; and, means for selectively interconnecting said first and second filter sections in response to a mode control signal by coupling the respective comparison outputs of the upper and lower limit comparators of one filter section to respective inputs of the upper and lower limit comparators of the other filter section.

* * * * *